Aug. 25, 1959
D. J. PEEPS
2,900,950
AUTOMATIC COATING APPARATUS
Filed May 31, 1956
9 Sheets-Sheet 6
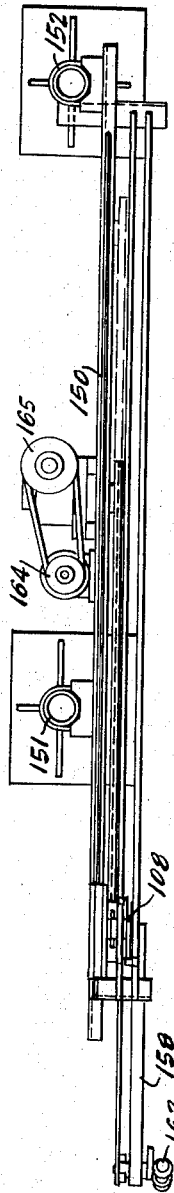
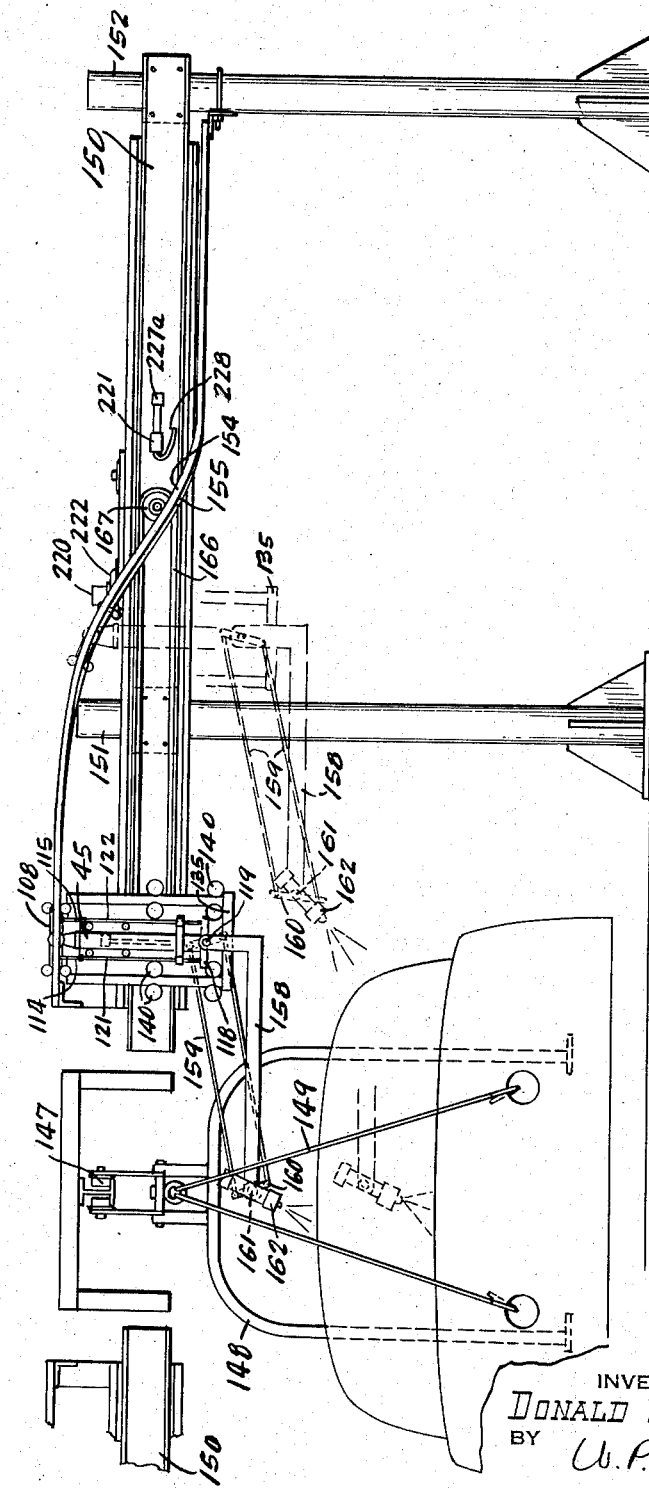
INVENTOR:
DONALD J. PEEPS.
BY
W. P. Carr
ATTORNEY

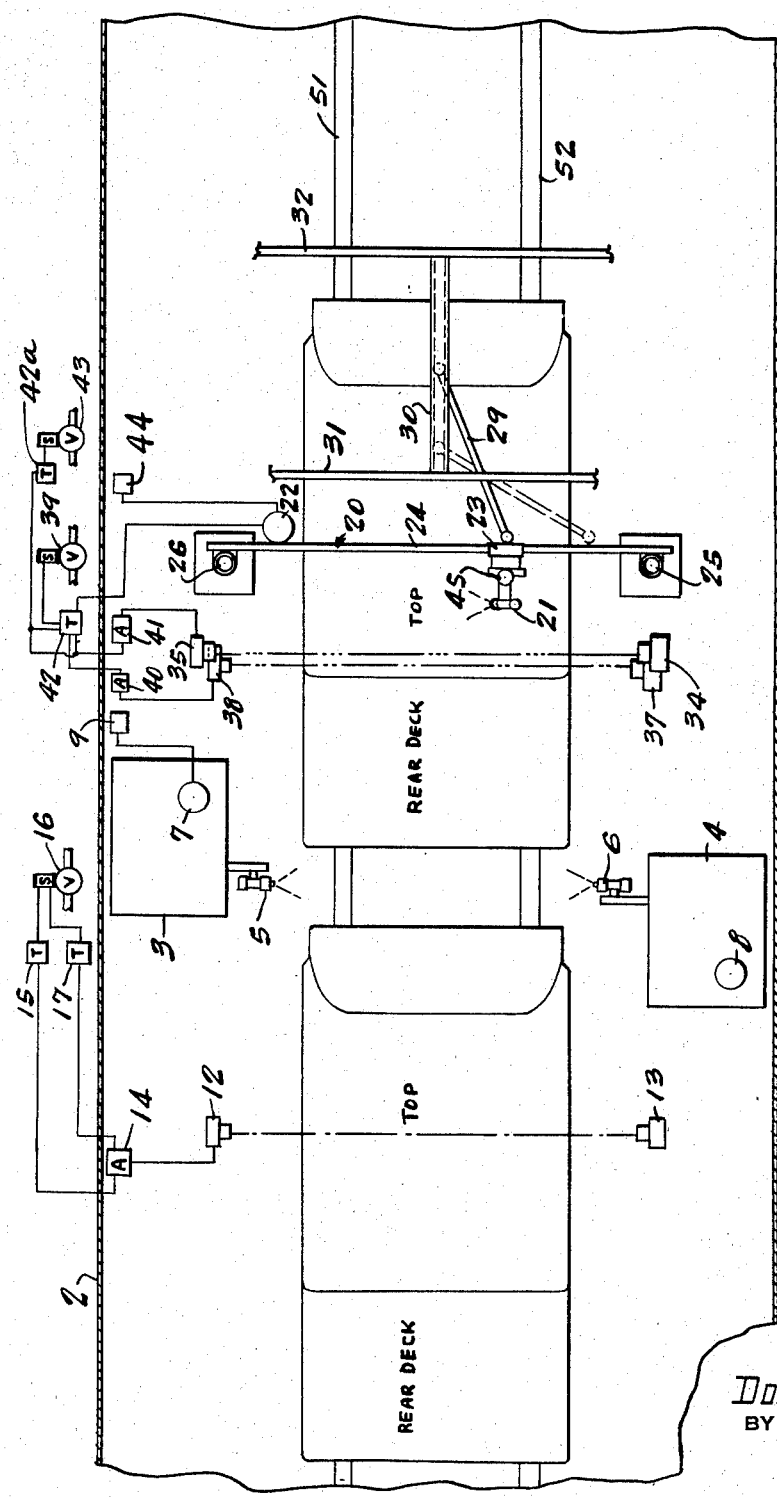

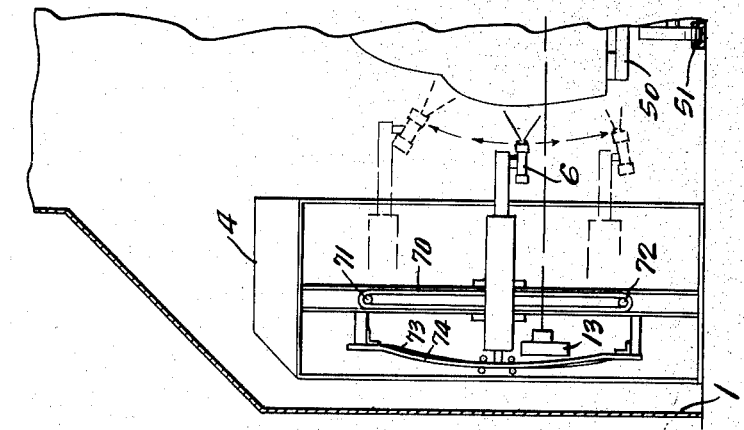
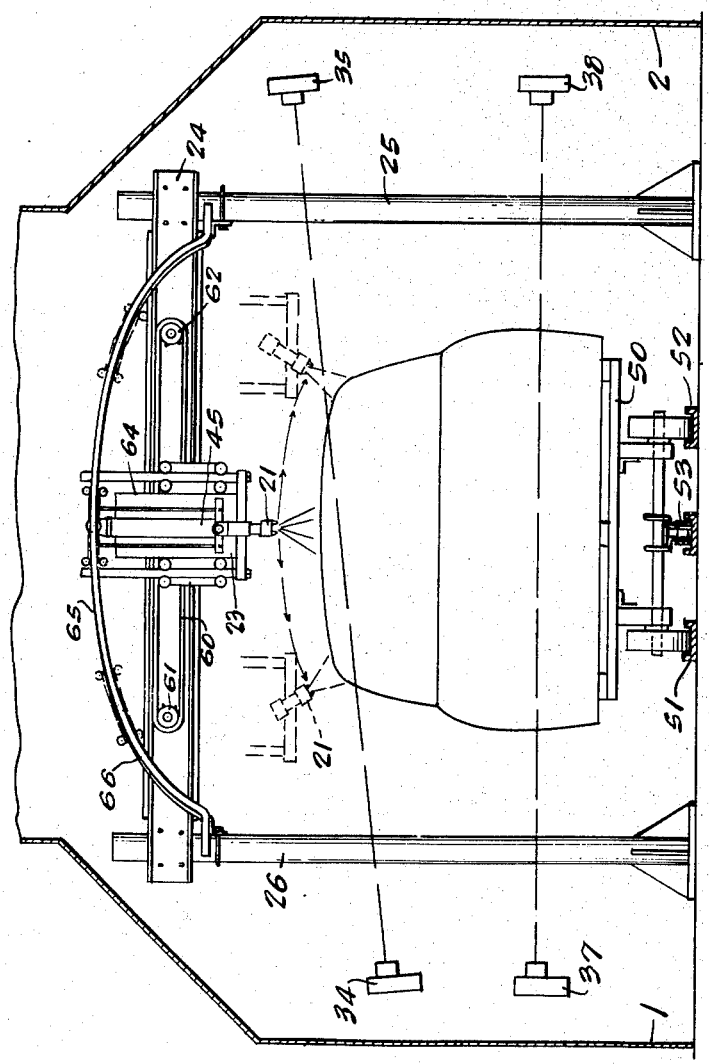

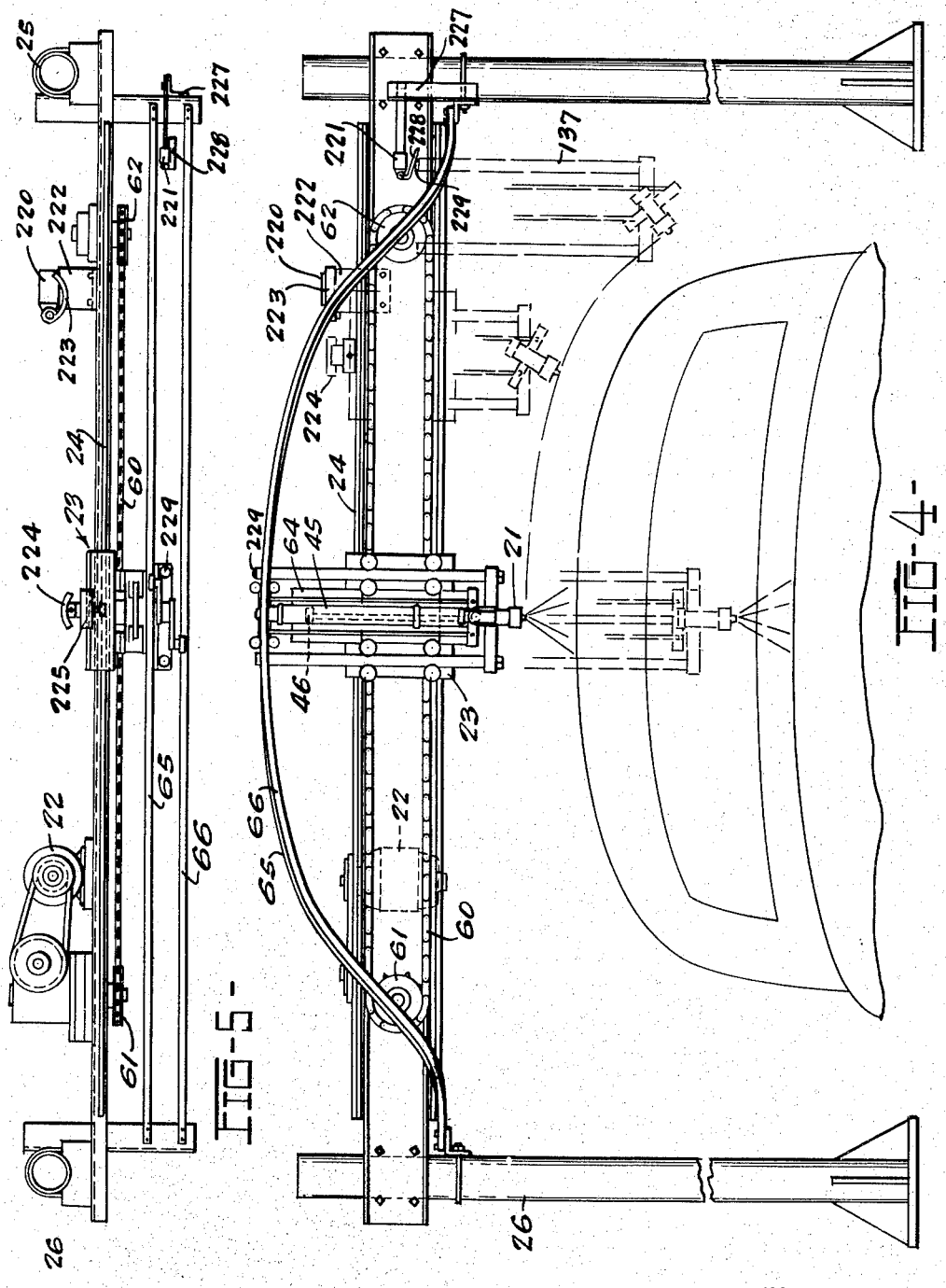

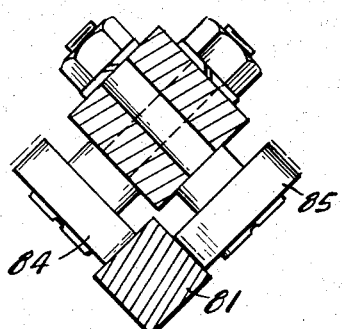
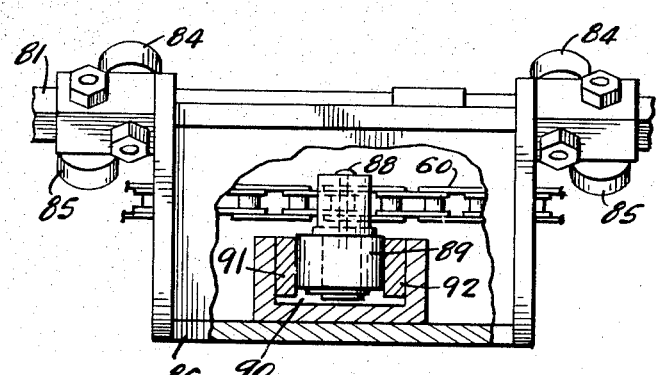
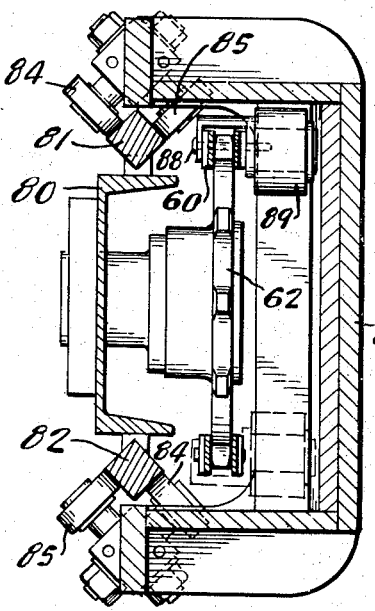
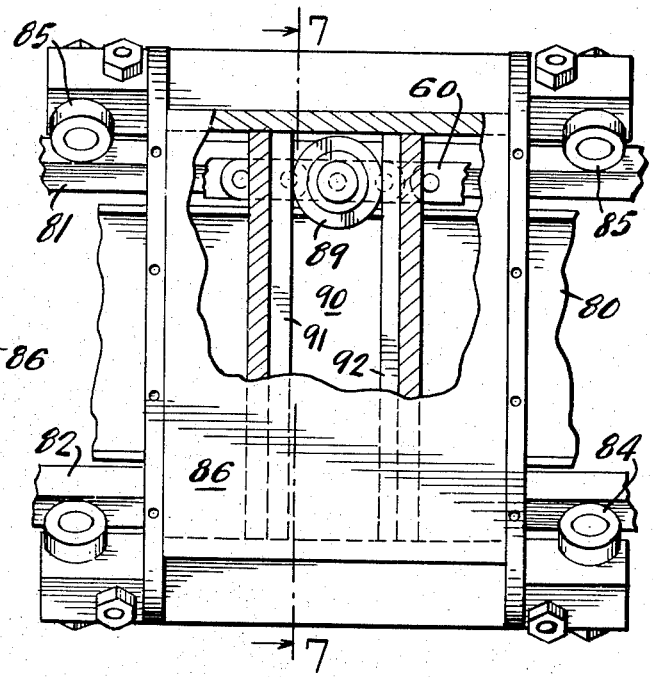

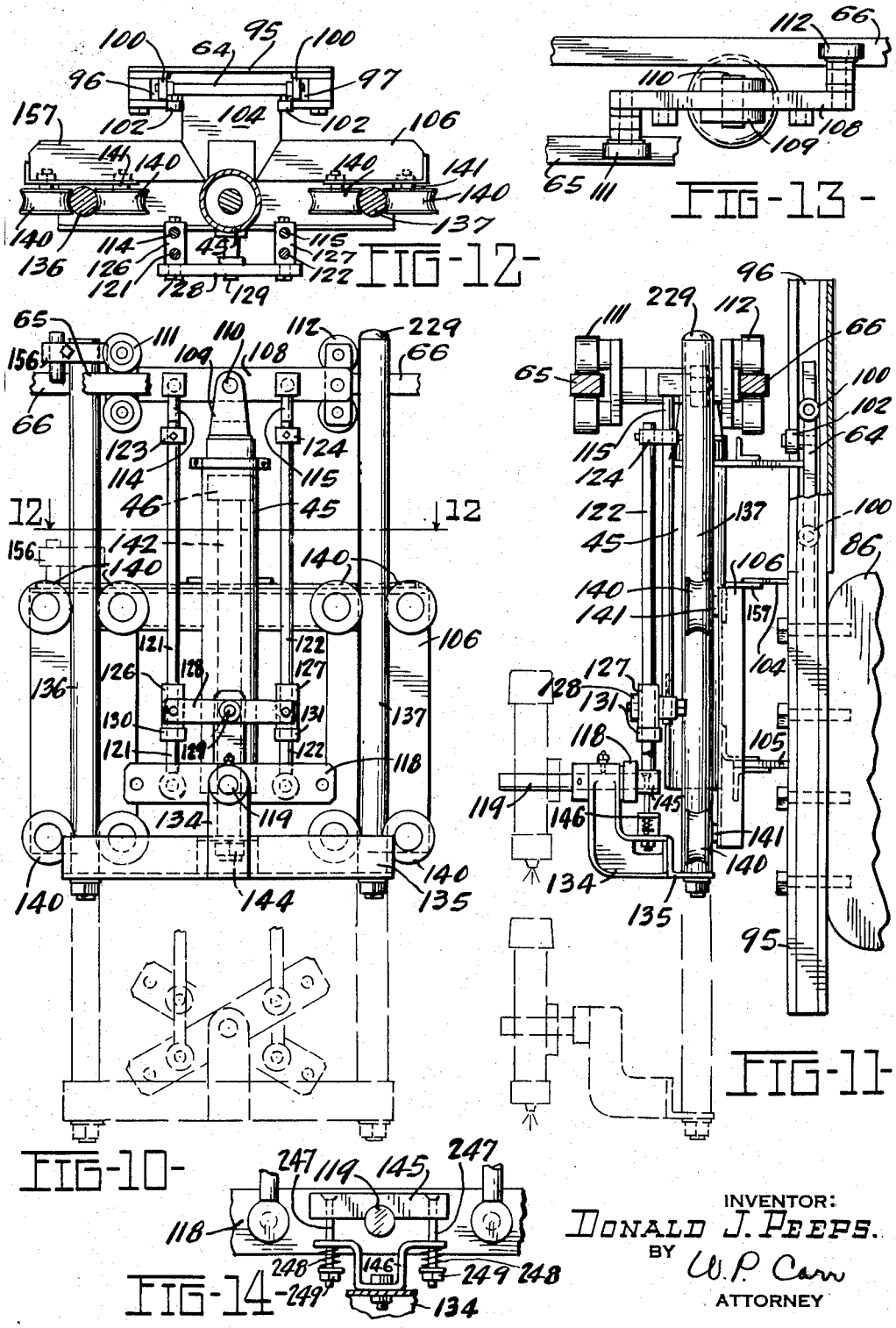

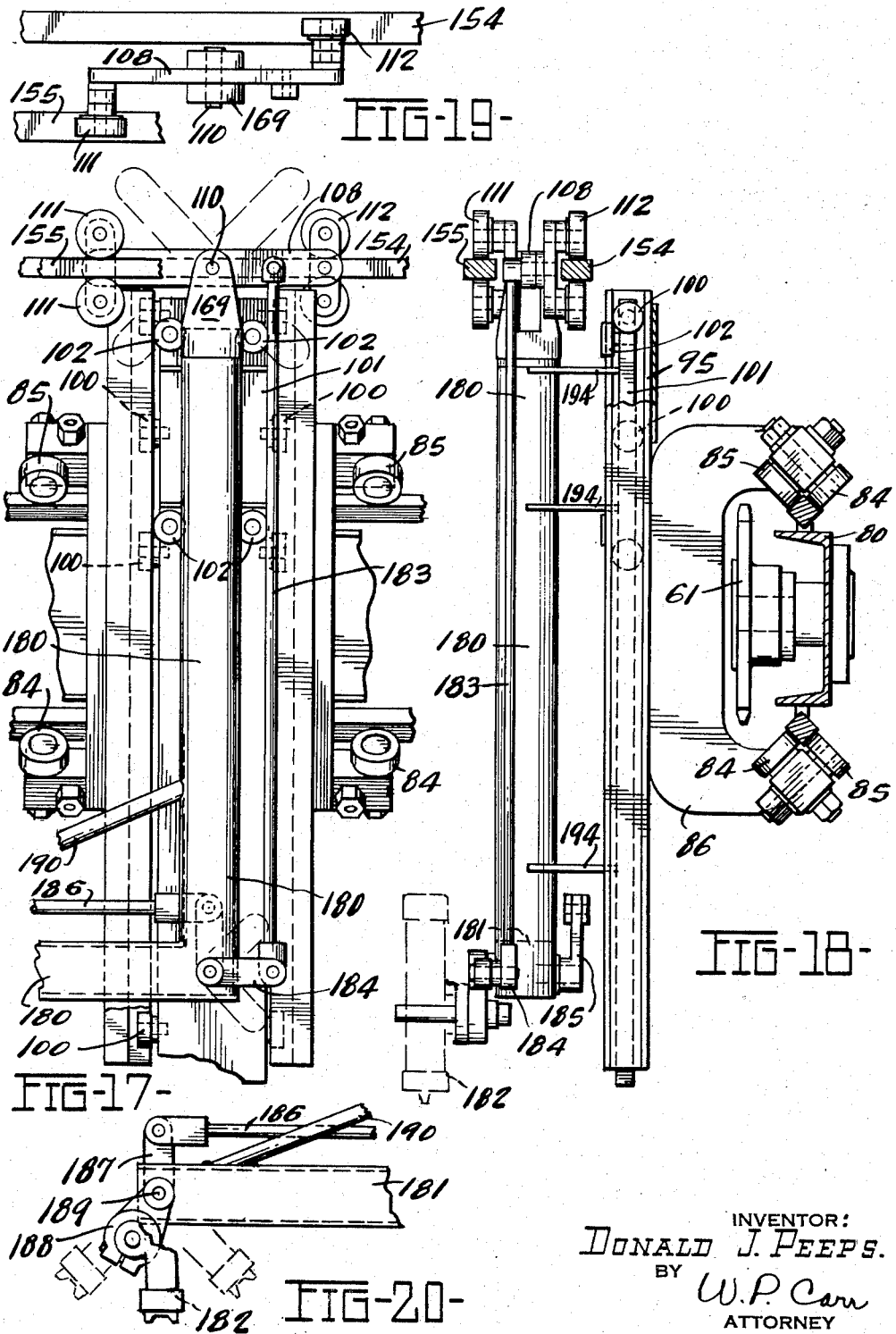

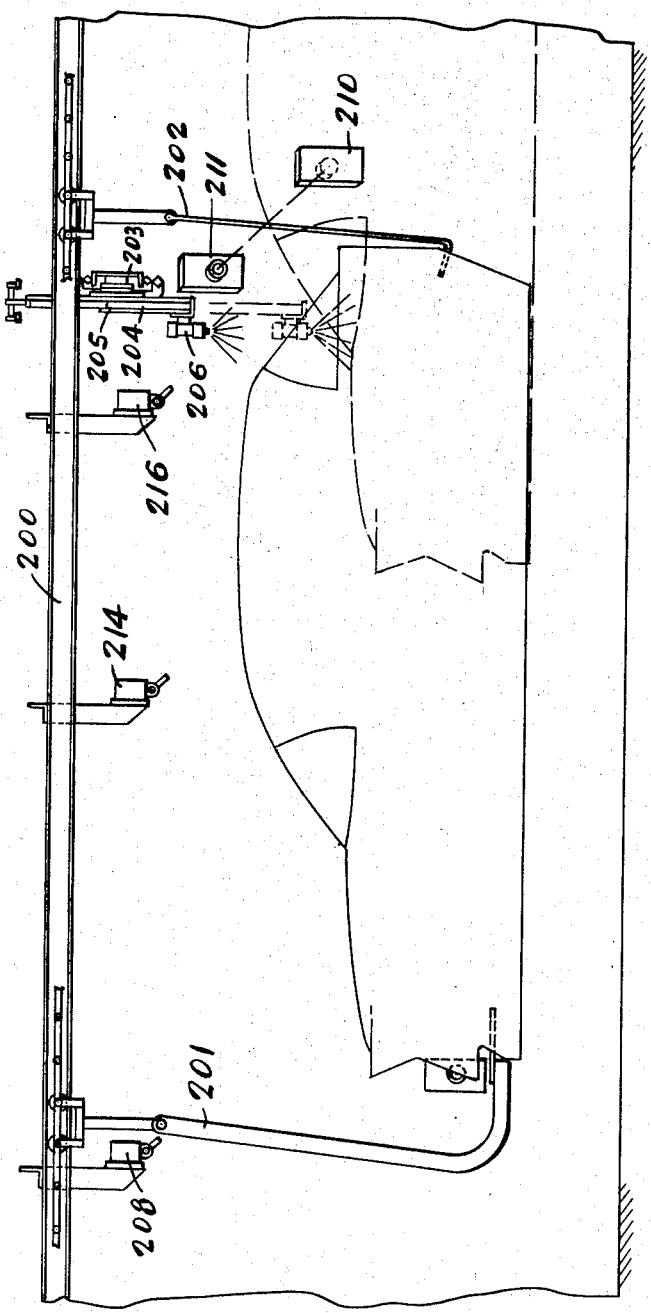

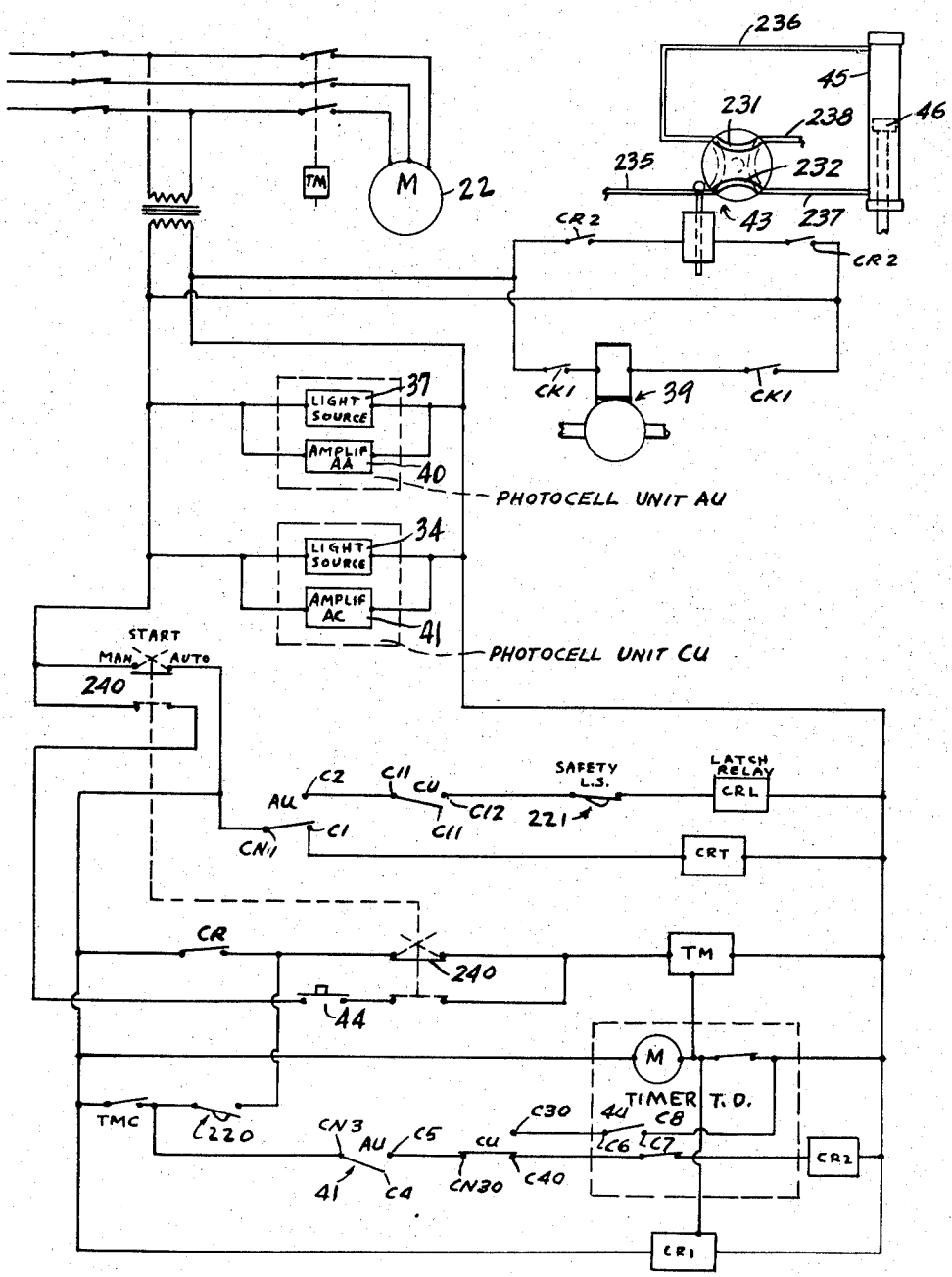

United States Patent Office 2,900,950
Patented Aug. 25, 1959

2,900,950

AUTOMATIC COATING APPARATUS

Donald J. Peeps, Rossford, Ohio, assignor to The De Vilbiss Company, Toledo, Ohio, a corporation of Ohio Application May 31, 1956, Serial No. 588,489

16 Claims. (Cl. 118—2)

This invention relates to apparatus for automatically spray coating the surfaces of comparatively large articles such as the bodies of passenger automobiles as they are transported along a continuously advancing conveyor line.

More specifically it relates to spray coating apparatus in which one or more spray guns are reciprocated in a generally vertical or horizontal path and are tilted and moved crosswise of the path to maintain the spray guns in proper relation to the contoured surface being coated.

The invention further relates to such apparatus having various controls establishing the spraying action in accord with the progress and position of the articles upon the conveyor line.

While the apparatus of this invention is applicable to many products, for the purpose of explanation its utility in connection with automobile bodies is discussed herein.

The common industrial practice of conveyorized production is well known. In large automobile plants it is utilized principally in the form of overhead monorail chain conveyors by which various components are carried through different work and assembly stages to finally reach the main assembly line in exact predetermined synchronized order.

The larger units such as the body may be carried on a floor type conveyor in which dollies, on which the bodies are set, are pulled by a chain along a pair of tracks. The latter arrangement simplifies the coating equipment required as the hangers supporting bodies from a monorail conveyor present problems in the placement and operation of the coating equipment.

In order that the automobile bodies move along at a sufficiently high speed to coordinate with the production movement of the lesser elements of the final assembly, the coating is preferably applied automatically as quickly and as completely as possible leaving a minimum of hand finishing or retouching.

The obstacles and difficulties which must be overcome are numerous.

In the first place the surfaces involved are curved which requires that the spray guns be tilted in order to maintain them desirably normal to the surfaces and also must be moved transversely of the general plane of their reciprocation to keep them at a fairly uniform distance from the surfaces.

In addition there are abrupt offsets in the body surfaces such as that between the roof and the rear deck. Quick and substantial shifting of the path of the spray guns is required to accommodate such a change in the surface contour.

Of special importance, in order not to waste coating material and to entirely coat the vehicle body, is the timing of the operation of the spray equipment in accord with the approach and movement of each body unit. Also, with bodies of varying dimensions the spray apparatus must be precisely controlled to fit the particular body proceeding through the coating station.

With bodies suspended from overhead conveyors substantial hangers of spreading shape are necessary. Accordingly the spray equipment may not be fixedly placed above the path of the bodies in a manner to block the movement of such hangers.

Among other problems that must be considered are those arising from contingencies such as interruptions of the conveyor movement, and of the electric power.

It is the purpose of this invention to provide apparatus that overcomes the aforementioned difficulties and problems as well as others that may appear from the following description. Additional objects and advantages will also become apparent with perusal of the subsequent description and with reference to the drawings, in which:

Figure 1 is a diagrammatic plan view of an automobile body conveyor line showing positions of apparatus embodying this invention;

Figure 2 is an elevation of the top coating machine of Figure 1;

Figure 3 is an elevation of a side coating machine of Figure 1;

Figure 4 is an enlarged elevation of the top coating machine of Figure 2;

Figure 5 is a plan view thereof;

Figure 6 is an enlarged front elevation with parts broken away of the main portions of the spray gun carriage and the tracks on which it is mounted for straight line reciprocation;

Figure 7 is a vertical section taken on the line 7—7 of Figure 6;

Figure 8 is a plan view with a portion broken away of the track and carriage parts shown in Figure 6;

Figure 9 is an enlarged section of the top edge of the track showing how the wheels of the carriage ride on the upper sides of the square section bar;

Figure 10 is a front elevation of a spray gun carriage having a piston for changing the vertical position of the spray gun independently of the contour bars;

Figure 11 is a side elevation of the carriage of Figure 10;

Figure 12 is a horizontal section taken on the line 12—12 of Figure 10;

Figure 13 is a plan view of the rocking link that tilts the spray gun and portions of the contour bars which control its positioning;

Figure 14 is an elevation of the braking device which restrains undirected turning of the spray gun mounting shaft;

Figure 15 is an elevation of one of a pair of machines for coating tops when the automobile bodies are suspended from an overhead monorail conveyor instead of transported upon track guided dollies;

Figure 16 is a plan view thereof;

Figure 17 is an elevation with parts broken away of a different form of spray gun carriage adapted for incorporation in one of a pair of split top machines as shown in Figures 15 and 16;

Figure 18 is a side elevation of the carriage of Figure 17;

Figure 19 is a partial plan view of the top contour bars and the spray gun rocking link between rollers riding on the bars;

Figure 20 is a side elevation of the end of the arm on which the spray gun is tiltably mounted;

Figure 21 is a diagrammatic side elevation of a monorail conveyor supporting a vehicle body showing the location of various control switches; and Figure 22 is a diagram of the principal electrical elements and a typical circuit involved in the operation of the top coating machines of Figures 1, 2, 4, 5, 15 and 16.

Referring to the drawings in more detail the diagrammatic plan view of Figure 1 depicts two vehicle bodies being drawn on dollies by a chain driven conveyor through two coating stations enclosed between walls 1 and 2 of a spray booth.

In the first station are two opposed side coating machines 3 and 4 which reciprocate spray guns 5 and 6 in vertical paths. Machine 4 is shown in elevation in Figure 3. Motors 7 and 8 operate the reciprocating mechanisms. In this instance the motors are started and stopped by a manual switch 9.

Discharge of coating by the spray guns is controlled independently of the reciprocating mechanism by photo electric cell 12 responding to the interception and sequential clearance of a light beam from lamp 13 by a vehicle body traveling on the conveyor.

When the light beam is blocked from reaching cell 12 by the fore part of an approaching body a signal from the cell enlarged by amplifier 14 is delivered to a delay timing device 15 set in accord with the established rate of travel of the conveyor. The device 15 withholds delivery of the spray discharge signal to permit the body to move from the location of the cell 12 and lamp 13 to a position between the spray guns 5 and 6, a distance which may be approximately six feet. Actuation of the spray guns is brought about pneumatically when the electric signal through suitable relays operates a solenoid air valve 16. The spray guns are of conventional design in which the atomizing air and coating material valves are opened and closed by movement of an air piston.

When the body clears the path of the light beam and the beam again strikes the photo electric cell 12 the reaction of the cell generates a second signal that is restrained a suitable interval by a second timing device 17 before it terminates the coating discharge by reversing the solenoid valve 16.

The reciprocation of the spray guns continues without interruption during and between periods of coating material discharge.

In the second coating station of Figure 1 is a top and rear deck coating machine 20 shown in more detail in Figures 2, 4, and 5, which reciprocates a spray gun 21 transversely above the conveyed vehicle bodies. The motor driving the reciprocating mechanism is portrayed at 22. The carriage 23 supporting spray gun 21 rides on track 24 mounted on posts 25 and 26.

Conduits for delivering air and coating material to the spray gun are supported along a rigid tube 29 pivoted at one end to the carriage 23 with its other end sliding in a channel 30 which is mounted between supporting bars 31 and 32.

Two sets of photo electric cells and lamps, one above the other, are positioned in advance of the top coating machine 20. The upper pair comprising lamp 34 and cell 35 are at a level to intercept the portion of the vehicle body extending above the level of the rear deck while the lower pair comprising lamp 37 and cell 38 scan the full length of the body. The electrical system is so arranged that the beams from both lamps 34 and 37 must be blocked to generate coacting signals to actuate carriage reciprocating motor 22 and a solenoid air valve 39 controlling the coating material discharge of the spray gun 21. These signals pass through amplifiers 40 and 41 and through a timer 42 to establish a delay compensating for the time required for the body to travel between the position of the lamps and the cells and the spray gun path.

As the roof of the vehicle body slopes down to the rear deck, the light beam from lamp 34 is freed to reach photo electric cell 35. The electrical impulse arising from this renewed receipt of the beam by the cell is amplified and with a momentary delay provided by supplemental timer 42a actuates a solenoid air valve 43 to release air to a cylinder 45 and its piston 46 from which the spray gun is suspended. The force of the air drives the piston and the spray gun downwardly into proper coating distance of the rear deck as illustrated in Figure 4. As the end of the body passes past the range of lamp 37 and cell 38, the renewed impact of the light beam starts a delayed electrical reaction through timer 42 which stops motor 22 and which, through solenoid valve 43, raises the spray gun and, through solenoid valve 39 stops the spray discharge. The vertical positioning of lamps 34 and 37 and cells 35 and 38 may be seen in Figure 2.

Referring to the showings of Figures 2 and 3 it may be observed how the bodies ride on wheeled dollies 50 which are drawn along tracks 51 and 52 by chain 53. The basic straight line reciprocating motion of the spray gun carriage of the machine 20 is provided by an endless chain 60 turning on sprockets 61 and 62 as illustrated in Figures 2, 4, and 5. A spray gun-carrying plate 64 of the carriage 23 is slidable in a path crosswise of the chain movement and generally normal to the surface of the vehicle body. In order to have the spray gun follow the curvature of the surface being coated, the movement of plate 64 is determined by a pair of contour bars 65 and 66 the mean curve of which approaches that of the body surfaces involved—in this case that of the roof and rear deck. The lowering of the spray gun by piston 46 for rear deck coating is independent of the movement of plate 64 as explained more fully later.

The machine 4 for coating the side of the car body as may be seen in Figure 3 has an endless chain 70, similar to chain 60, driven around sprockets 71 and 72, and a pair of contour bars 73 and 74 conforming to the configuration of the side of the vehicle body.

Further details of the spray gun carriage 23 and track 24 of the top coating machine are illustrated in the enlarged views of Figures 6 through 14. The main member of the track is a U-beam 80 turned on its side, to the legs of which are welded square bars 81 and 82. The bars are positioned with the diagonals of their cross sections perpendicular to the legs. The outer adjacent surfaces of the bars provide runways for four pairs of staggered wheels 84 and 85 of the channel-shaped carriage body 86. The lower pairs of wheels are preferably mounted on eccentric shafts which may be locked in varying turned positions to bring the wheels closer or further away from the upper pairs to originally fit the wheels to the track and later to compensate for wear.

Mounted on a special pin 88 of the endless chain 60 is a roller 89. The roller is lodged in the runway 90 between gibs 92 and 91 of the carriage body 86. As the roller 89 follows the chain in its courses between sprockets 61 and 62 it drives the carriage body 86 back and forth alternately bearing on the parallel faces of gibs 91 and 92.

Fixed to the outer side of the carriage body 86 is a composite panel 95 (see Figures 11 and 12). Along the vertical edges of the face of the panel are two opposed guide ways 96 and 97. The guide ways receive, between their sides, rollers 100 mounted on studs extending from the edges of the vertically slidable plate 64. Additional rollers 102 on the face of the plate bear on the outer sides of the guide ways to maintain the plate 64 in a straight path between the guide ways.

Secured on brackets 104 and 105 projecting from the slidable plate 64 is a frame 106. The air cylinder 45 with its piston 46 is mounted on the frame. The slidable plate 64 and the attached frame is vertically supported by the air cylinder 45 through the attachment of the cylinder at its upper end with the rocking link 108. The clevis 109 on the end of the cylinder straddles the link and a pin 110 constitutes a pivotal connection therebetween.

One end of the link 108 is swivelly joined to a roller assembly 111 riding on contour bar 65 while the other end of the link is similarly connected to a roller assembly 112 riding on contour bar 66. As the plate 64 and frame 106 are suspended through the cylinder from the center of the link, tilting of the link arising from its ends following the different curvatures of the separate contour bars does not affect the vertical positioning of the plate and frame. The vertical movement of the latter simply follows that of the center of the link which travels in a line constituting a mean of the two contour bars 65 and 66, equidistant from both.

Pivotally connected to the rocking link 108 on opposite sides of the air cylinder 45 is a depending pair of spray gun tilting rods 114 and 115. These rods transmit the rocking motion of the link 108 to the spray gun or guns being reciprocated through a spray gun mounting strap 118 fixed upon a rotatable shaft 119. This transmission of motion is accomplished through a pair of extendible rods 121 and 122 which have collar members 123 and 124 fixed to their upper ends. The collar members have bores through which rods 114 and 115 loosely extend. Fastened to the lower ends of rods 114 and 115 are bushings 126 and 127 through which extension rods 121 and 122 slidably pass. A cross link 128 between the bushing and pivotally mounted on a stud shaft 129 fastened to cylinder 45 contributes to the maintenance of all four rods in parallel relation. Link 128 turns on shaft 129 in conformity with the movement of rocking link 108.

At their lower ends the extension rods 121 and 122 engage the spray gun mounting strap 118. The varying up and down movement of the upper rods 114 and 115 is accompanied by like movement of the lower extension rods 121 and 122 through the thrust of the bushings 126 and 127 against lock collars 130 and 131 fixed to the lower rods.

If a single spray gun is utilized it is preferably fastened by a holder upon shaft 119 and positioned to turn with shaft 119 as the axis of rotation. Two spray guns are preferably secured to opposite ends of the mounting strap 118 and directed slightly toward each other so that the resulting merging spray also is tilted with shaft 119 in effect the axis of turning.

The shaft 119 is journalled in an arm 134 fastened to angle iron cross piece 135. The latter is bolted at its ends to a pair of cylindrical bars 136 and 137. The bars are guided for vertical movement between four pairs of concave faced rollers 140 which are on stud shafts 141 extending from frame 106.

The assembly including the arm 134, cross piece 135 and vertical bars 136 and 137 is carried by piston 46 within air cylinder 45 through the connection of the piston rod 142 with cross piece 135 to which it is held by nut 144.

Air delivered to the lower end of cylinder 45 normally holds piston 46 at the upper end of its stroke within cylinder 45 and the gun supporting assembly including arm 134, cross piece 135, and vertical bars 136 and 137 in raised position. In this raised position of the assembly the reciprocating movement of the spray gun is in a curved path, as determined by the contour bars 65 and 66, and at a height suitable for coating the roof of an automobile body.

When the rear deck of the body arrives at the coating station, through reaction of the photo electric cell 35 the solenoid valve 43 is actuated to release air from below piston 46 and deliver air to the cylinder 45 above the piston. This shifts the gun supporting assembly downwardly with the bars 136 and 137 sliding down between rollers 140. The limit of this movement is determined by the abutment of stop member 156 adjustably fixed to the upper end of cylinder bar 136 against the top plate 157 of frame 106. In order that it strikes the plate 157 and avoids rollers 140 stop member 156 is angled rearwardly from bar 136. Collar members 123 and 124 on the upper ends of rods 121 and 122 are predeterminedly positioned thereon to descend to a light contact with the bushings 126 and 127 fastened to the lower ends of rods 114 and 115. The distance from the roofs to the rear decks of bodies varies and to accommodate such variations the position of stop member 156 on bar 136 and collars 123 and 124 on rods 121 and 122 are shifted accordingly. Through the contact between the collar members 123 and 124 and the bushings 126 and 127 the tilting action of the rocking link 108 is transferred through both pairs of rods to the gun mounting strap 118. Accordingly, the gun is tilted to keep it approximately normal to the surface being coated in the course of its reciprocating motion in its piston-lowered position for coating the rear deck of the body in the same manner as it is tilted in its reciprocation across the top of the car body.

In order that the angular position of the spray gun be not disturbed during its piston-driven displacement downwardly a spring loaded brake shoe 145 frictionally bears on shaft 119 to prevent its free turning. The brake shoe 145 is supported through a bracket 146 mounted on the arm 134. Bolts 247 extend from the brake shoe loosely through wings of the bracket. Springs 248 are compressed between the under side of the wings and nuts 249 on the ends of the bolts 247. The tension of the springs thrusts the brake shoe downwardly. This assembly is illustrated in detail in Figure 14.

When the car bodies are suspended from monorail conveyors 147 by spreading hangers 148 and 149 as illustrated in Figure 15, a full top machine 20 cannot, of course, be positioned across the conveyor line. Instead, a pair of machines are placed on opposite sides in slightly staggered relation, with spray guns mounted on lateral extensions for reaching midway of the roof and rear deck of the body from both sides. The distance between the paths of the spray guns of the pair of machines is preferably three feet approximately.

As shown in Figure 15 each unit is generally similar to machine 20. The track 150 is mounted on posts 151 and 152 with a section projecting beyond post 151 toward the conveyor line. The contour bars 154 and 155 are substantially half sections of those of the full top machine 20.

The components of the carriage are the same except for the lateral gun holding extension 158. It is rigidly fastened at its inner upright portion to cross piece 135, taking the place of the arm 134, and has a bore at the upper end of the upright portion providing a supporting bearing for the rotatable shaft 119. A four-bar linkage 159, with one bar keyed to shaft 119 and the opposite parallel link 160 secured upon rotatable shaft 161 on the end of extension 158, transfers the tilting movement of the rocking link 108 to the spray gun 162 mounted to turn with and on the axis of shaft 161. As the conventional automatic spray gun has a mounting bore offset from its longitudinal center line, it would not pivot in a true arc if carried directly upon shaft 161. In order therefore that the center line of the gun cross the axis of shaft 161 the spray gun must be fastened to a bracket angled from the shaft such as bracket 188 in Figure 20. Another arrangement involves a mounting strap set on the shaft with a hole at one side of the shaft for receiving a spray gun supporting rod. If two spray guns are to be used they are mounted on the ends of the strap, In Figures 17 through 20 the carriage of a split top machine is illustrated which does not include an air piston for vertically shifting the horizontal path of the spray gun. Such a machine is adaptable for use as one of a pair in coating the top of a freight car or some other article the top of which extends without much deviation in a general horizontal plane, instead of having a substantial change in level as occurs between the roof and rear deck of the usual automobile body.

In the form shown in Figures 17 through 20 an L-shaped arm 180 has a vertical section secured to the slidable plate 101 by brackets 194. At the upper end of the section is a clevis 169, like the clevis at the top of piston 46, by which the arm 180 is suspended from the rocking link 108 by pin 110.

On the laterally projecting end 181 of the arm 180 is supported a spray gun 182. Tilting of the spray gun is accomplished by transmitting the motion of rocking link 108 downwardly through rod 183 to the short strap 184 which is mounted with elbow connector 185 on a common shaft journalled through arm 180. A horizontal rod 186 and an arm 187 complete the train of motion transmitting elements to the shaft 189 on which the spray gun 182 is secured by bracket 188. A bracing member 190 extends between the legs of arm 180.

Because they are not immediately opposite each other the units of a pair of split top coating machines must have separate control devices. These may be actuated by switches tripped by a hanger or operated by a set of photo electric cells like those utilized for the single full top machine 20.

The utilization of switches, as far as feasible, is preferred because of their lower cost and simplicity. In the diagrammatic elevation of Figure 21 there is illustrated a body carried by an overhead monorail conveyor 200 from hangers 201 and 202. Switches tripped by the rear hanger 201 provide the main controls while a photo electric cell reports the arrival of the rear deck to the spray station.

The track 203 and carriage 204 of a reciprocating machine 205, similar to that of Figure 15, is positioned for coating the further half of the roof and rear deck of the auto bodies.

The location of the spray gun 206 when coating the roof is shown in full lines and indicated in dotted lines in its rear deck coating position.

Switch 208 is mounted at one side of the conveyor 200 and has a trigger arm extending down into the path of the upper portion of hanger 201. With a production line carrying bodies all of the same length the switch 208 is established at the particular distance from the spray station which would position the forward edge of the roof of the body in the spraying zone when the rear hanger 201 trips the switch. This could be a distance of twelve and a half feet. The front hanger 202 has by this time passed the crosswise path to be taken by the spray gun.

Actuation of the switch starts the reciprocation of the carriage 204 from its starting position on the end of the track away from the conveyor. The spray gun at the initiation of the carriage movement is in its upper piston-raised position. Tripping of switch 208 also operates the solenoid valve, such as 39 in Figure 1, which releases air to the spray gun and effects the coating discharge.

The light beam projected by the lamp 210 toward the photo cell 211 is directed along a line passing slightly below the level of the main portion of the roof of the body, and across the conveyor slightly beyond the location of the reciprocating path of the spray gun. In order that the cell does not release undesired signals arising from the interception of the light beam by hangers 201 and 202 the signalling circuit from the cell is not operative until the rear hanger 201 trips switch 214 which closes the signalling circuit. By this time the path of the beam is blocked by the fore part of the roof of the body.

The rear slope of the roof permits the light beam to reach the cell just as the rear deck enters the spraying zone. The resulting signal instantaneously operates the solenoid air valve, similar in function to valve 43 in Figure 1, to direct air to the piston carrying the spray gun to move the spray gun to its lower rear deck coating level where it immediately starts the coating operation. The cell then becomes non-functioning until reactivated by another tripping of the switch 214.

Another arrangement for preventing untimely reaction of a cell occurring from the interception of the light beam by the hangers is the placement of a switch in the path of the hangers immediately above the location of the cell and lamp which breaks the signaling circuit of the cell while the hangers cross the light beam.

As the coating of the rear deck is completed the reciprocation and coating discharge of the spray gun is terminated through the tripping of switch 216 by rear hanger 201. Movement of the carriage 204 ends at its extreme position away from the conveyor and the spray gun is brought back to its piston-raised upper position ready for the start of the coating cycle of the next body.

In both full top and split top machines it is important that at the completion of the coating of a body the spray guns terminate their movement in a raised position at the end of the track away from the conveyor line. With this set starting point synchronism with the advance of the bodies may be more precisely established.

Also, this arrangement is necessary in order that the spray guns be out of the path of the hanger from an overhead monorail conveyor carrying the front end of the body and to prevent the spray guns from starting in their lowered rear deck coating plane in which they would collide with the higher fore portion of the body.

This location of the spray guns at the finish of each operation is accomplished in both the full top coating machine and the split form by two switches at the outer end of the track. A pair of such switches 220 and 221 is schematically illustrated in Figures 4 and 15. Switch 220 is associated with the circuit to the motor driving the carriage in a manner to prevent the effectiveness of a motor stopping signal from a photo electric cell or from a limit switch until the carriage approaches the withdrawn position and trips the switch. A bracket 222 supports switch 220 on the rear side of the track 24 in Figure 4 (track 150 in Figure 15) near the end at which the carriage 23 is to be brought to a stop. The arm 223 of the switch is tripped by a cam 224 extending from the rear side of the carriage. The supporting bracket 225 for the cam is slidably held on the edge of the carriage in order that its position may be changed for selection of the particular location where it is desired to stop the carriage.

The other switch 221 is likewise associated with the circuit to the motor. In this arrangement shown in Figure 4, this switch must be held closed by bar 137 in its raised position in order that starting current reaches the carriage reciprocating motor. Switch 221 is supported between and above contour bars 65 and 66 from a bracket 227 extending from post 25. As indicated in dotted lines the top end of cylindrical bar 137 when in its upper position trips arm 228 of switch 221. For this purpose bar 137 has a rounded brass cap 229 as indicated in Figures 10 and 11. In the machine of Figure 15 switch 221 is mounted on a bracket 227a projecting from track 150. The switch 228 is tripped in the same way by the cylindrical bar 137 as illustrated in Figure 4.

In order to prevent continued operation of the coating machines should there be power failure that stops the conveyor movement, an interlocking switch is installed to cut off the current to the machines when the current operating the conveyor is interrupted. The elements of the circuit, particularly the time delay devices, are so designed that the cycle of timing interrupted by the action of the interlocking switch continues to completion when operation of the coating machines is resumed.

Another supplemental control element is switch 44 shown in Figure 1 as connected to motor 22 driving carriage 23 on track 24. This switch is referred to as an inching switch and is used only for momentary actuation of motor 22 to gradually change the starting location of the carriage 23. To make switch 44 effective it is necessary to first throw a cut-out switch breaking the automatic control circuit to the motor.

The electrical elements including the solenoid air valves referred to herein in connection with the operation of the top coating machines of Figures 1, 2, 4, 5, 15 and 16 are shown with associated electrical elements in the wiring diagram of Figure 22. This diagram is considered conventional and portrays one of many circuit arrangements which may be devised for the sequence of operations involved. It is intended to illustrate the general circuit plan and major components but is necessarily of a condensed and schematic nature.

The functioning of the circuit is applicable to the operations of the various top coating machines herein described and the elements are in their neutral positions between bodies.

When an automobile body interrupts the beam from light source 37 directed toward the photocell 38, a part of the photocell unit AU, the signal generated in the amplifier 40 or AA moves relay contacts CN1 to C2 and CN3 to C5. Also the relay contacts C6 to C7 within the timer TD (incorporating units 42 and 42a) are brought together. Nothing happens since no circuit is completed.

The body then interrupts the beam from light source 34 directed toward the photocell 35 of the photocell unit CU and the signal developed by amplifier 41 or AC makes relay contacts CN11 to C12 and CN30 to C30. This brings in latch relay CRL which through its contact CR energizes motor starter TM to start motor 22 after the momentary delay effected by timer TD through the completion of the circuit through CN30—C30.

When the upper portion of the car body passes the beam directed from light source 34 to cell 35 in the photocell unit CU the beam is again received by the cell and this returns the relay contacts CN11 back to C11 and CN30 back to C40. The relay CRL remains latched and motor 22 continues in operation. The circuit to relay CR2 is closed and solenoid valve 43 is actuated to direct air through valve passage 231 and through air line 236 to the top of cylinder 45. This moves piston 46 and the spray gun depending therefrom downwardly.

Solenoid valve 43 receives air from piping 235 and is vented to the atmosphere through nipple 238.

When the rear end of the auto body passes the beam from light source 37 the photocell unit AU reacts to reverse its relay contacts CN1 back to C1 and CN3 to C4. This knocks out latch relay CRL by energizing the latch tripping relay CRT and opens contact CR. Motor 22 temporarily continues to operate because motor contactor TMC is still provided current through the carriage operated limit switch 220 which is closed with the carriage away from its starting position. The carriage therefore continues its present cycle of movement until the end of its back trip when it opens switch 220 thereby stopping motor 22 and its own further movement.

The resulting opening of contact TMC de-energizes relay CR2 and rotates solenoid valve 43 to supply air through passage 232 and line 237 to the lower end of cylinder 45. This drives piston 46 and its attached spray gun back to their top positions. The upward movement of the guiding bar 137 with the spray gun closes safety switch 221 (as shown in Figure 4) and re-establishes the circuit in its neutral position as illustrated in Figure 22 ready for the arrival of the next auto body.

The motor of the timer TD is idicated at M₁. The relays CR1 govern the operation of the spray discharge valve 39. Two of the relays CR1 and CR2 are required as a safety measure. The inching motor switch 44 is only operative when the circuit is shifted from automatic to manual control by the selector switch 240.

It may be seen from the preceding that this invention provides automatic spray coating machines for accurately and completely coating the sides and top of conveyorized articles such as auto bodies. The invention further provides controls which gauge the advance and contour of the articles and adapts the movement and the discharge of spray guns thereto. In addition the invention provides means for temporarily projecting spray guns between hangers supporting articles from an overhead conveyor or between other transient obstacles to apply coating to the tops of the articles.

The principal mechanisms and features of the invention which contribute to the success of the invention include those which provide the various movements of the spray gun or spray guns.

There is the carriage and track by which the spray gun is reciprocated in its main path, the plate moved transversely of the track by its suspension from the contour bars which gives the spray gun a corresponding transverse movement, the piston motivated frame which independently shifts the spray gun an additional distance in the same transverse direction, and finally the rocking link and depending rods which pivot the spray gun during the course of its other movements.

Important to the attainment of the special advantages of the apparatus of the invention are the various controls including the limit switches and photo electric cells reporting the progress and contour of the articles to be coated, the time delay devices which withhold operation of the spray gun until the proper instant, and the solenoid valves which govern the flow of air to the pneumatically operated spray gun and to the piston shifting the gun position.

There are also the novel split top machines arranged in pairs for projecting the spray gun on extension arms between conveyor hangers or other obstacles to reach the tops of articles to be coated.

While in this description a single spray gun has been generally referred to, it is, of course understood that a plurality of spray guns are frequently mounted on the machines disclosed herein.

It also must be realized that details of conventional design involving the construction and pneumatic control of the spray guns and other elements have been omitted for the purpose of condensing the disclosure and description.

The embodiments of my invention presented herein are exemplary only and modifications may, of course, be made therein without departing from the spirit of my invention.

What I claim is:

1. In an apparatus of the type described a horizontal track, a carriage, driving mechanism reciprocating the carriage upon the track, a spray gun reciprocated with the carriage, two bars of different contour extending along the track above the carriage, a rocking link between the bars and generally parallel thereto, a roller supporting one end of the link on one bar, a second roller supporting the other end of the link on the other bar, a vertically slidable connecting means carried by the carriage depending from the center of the link, the spray gun being supported upon the lower end of the connecting means, whereby the spray gun in addition to its reciprocation with the carriage is moved vertically by the connecting means according to changing elevation of the center of the link as the rollers on the ends of the link follow the contours of the two bars.

2. An apparatus according to claim 1 in which there is a pivotable strap on the connecting means on which the spray gun is mounted and rods joining the ends of the rocking link with the ends of the pivotable strap tilt the spray gun according to the tilting of the link between the bars.

3. An apparatus of the type described, a track, a carriage, a power drive means reciprocating the carriage upon the track, a runway on the carriage extending transverse to the axis of the track, a first mounting slidable in the runway, mechanism sliding the first mounting in the runway, a second mounting carried by the first mounting and movable thereon in a path parallel to the runway, means independent of the mechanism for sliding the first mounting and for moving the second mounting, and a spray gun supported upon the second mounting, whereby the spray gun is reciprocated with the carriage, is moved transverse to the axis of the track primarily with the sliding first mounting and secondarily and to a further extent with the moving second mounting.

4. An apparatus according to claim 3 in which the power drive means reciprocating the carriage includes an electric motor, the mechanism sliding the first mounting includes a cam bar, and the means moving the second mounting includes a fluid driven piston.

5. An apparatus according to claim 4 in which there is a photo electric cell sensing the approach of an article to be coated by the spray gun and thereupon providing a signal, a solenoid valve controlling the flow of actuating fluid to the fluid driven piston, and means amplifying and transmitting the signal from the photoelectric cell to effect operation of the solenoid valve and thus permit actuating fluid to reach and move the fluid driven piston.

6. In an apparatus of the type described a track, a carriage, a spray gun supported by the carriage, an electric motor reciprocating the carriage upon the track, a main switch for starting and stopping the electric motor, and a supplemental switch maintaining the flow of current to the electric motor, after the main switch has been thrown to stopping position, until the carriage reaches one end of the track.

7. In an apparatus of the type described a track, a carriage, a spray gun supported by the carriage, an electric motor driven means reciprocating the carriage upon the track, main electrical control elements for starting and stopping the electric motor driven means, means, including a slidable spray gun mounting and a runway therefor on the carriage, moving the spray gun transversely of the track from a retracted to an extended position and back to its retracted position during the reciprocation of the spray gun with the carriage, and a supplemental control switch actuated by said means to permit starting of the electric motor driven means only when the spray gun is in its retracted position.

8. In an apparatus of the type described for coating top surfaces of articles suspended between horizontally spaced hangers depending from an overhead conveyor a track for placement at one side of the conveyor and generally normal thereto, a carriage on the track, a motor driven means reciprocating the carriage upon the track, an extension arm projecting from the carriage toward the conveyor at a level intercepting the hangers and reaching beyond the end of the track and between the horizontally spaced hangers during a portion of the reciprocation of the carriage, and a spray gun mounted on the end of the arm and directed downwardly for coating top surfaces of articles carried on the conveyor whereby the carriage may be reciprocated to bring the spray gun between hangers for coating said top surfaces and to withdraw the spray gun out of the way of the hangers.

9. An apparatus according to claim 8 in which there are means for shifting the level of the path of reciprocation of the arm and spray gun according to the changing height of articles carried by the conveyor.

10. An apparatus according to claim 9 in which the means includes a vertically slidable mounting for the spray gun, a runway therefor, and a pneumatically driven piston directly connected to the mounting.

11. In an apparatus of the type described a track, a carriage, driving mechanism reciprocating the carriage on the track, a runway on the carriage extending transverse of the track, a plate slidable in the runway, a contour bar means along the track above the path of the carriage, a roller means riding on the contour bar means, a suspension rod from the roller means connected to the plate whereby the plate slides in the runway as the roller means follows the contour bar means, an air cylinder mounted on the plate, a piston within the cylinder, a piston rod extending downward from the piston, a spray gun, means by which the spray gun is attached to the piston rod, and means delivering air to the cylinder for driving the piston within the cylinder and the spray gun attached to the piston rod downwardly and maintaining the spray gun for an interval in such lowered position.

12. An apparatus according to claim 11 in which there are means tilting the spray gun during its reciprocation with the carriage and in its lowered position.

13. In an apparatus for coating articles traveling along a conveyor and having two successive surfaces of different levels to be coated, a spray gun stationed adjacent the conveyor, means operable to move the spray gun from a first position for coating the foremost surface of the articles to a second position for coating the succeeding surface of the articles, an electrical device tripped by the approach of an article to the location of the spray gun to actuate the spray gun for coating the foremost surface at one level of the article and a photo electric cell detecting the approach of the succeeding surface at a second level of the article and sending an operating signal to the means to move the spray gun from its first to its second position.

14. In an apparatus of the type described for coating articles traveling suspended by hangers from an overhead conveyor, a spray gun stationed adjacent the conveyor, a solenoid valve controlling the flow of actuating air to the spray gun, a lamp emitting a light beam across the path of articles carried by the conveyor and a photo electric cell in line with the light beam and arranged to respond to the interception of the light beam by an article and to send a signal to operate the solenoid valve as the article reaches the range of the spray gun and an electric switch positioned to be tripped by a hanger to maintain the photo electric cell nonresponsive when the hanger intercepts the light beam.

15. In an apparatus of the type described a track for positioning generally normal to a conveyor, vertical posts upon which the track is supported, a carriage riding on the track, a motor driven means for reciprocating the carriage on the track, one end of the track projecting unsupported away from the posts toward the conveyor, a lateral arm on the carriage extending toward the conveyor, a spray gun mounted on the arm, and control means maintaining the carriage at the end of the track away from the conveyor while no article is within range of the spray gun and reciprocating the carriage and the spray gun while an article is traveling on the conveyor within range of the spray gun.

16. In an apparatus of the type described, a track, a carriage, driving mechanism reciprocating the carriage upon the track, a bar pivotably supported between its ends by the carriage, a spray gun mounted upon the bar, a pair of parallel rods moving with the carriage and connected to opposite ends of the bar and means moving the rods lengthwise in opposite directions to pivot the bar and the spray gun during the reciprocation of the carriage.

References Cited in the file of this patent

UNITED STATES PATENTS

| | | |
|---|---|---|
| 2,345,834 | Schweitzer | Apr. 4, 1944 |
| 2,383,023 | Sykes et al. | Aug. 21, 1945 |
| 2,434,176 | Potthoff | Jan. 6, 1948 |